(12) United States Patent
Sakai et al.

(10) Patent No.: US 9,122,555 B2
(45) Date of Patent: Sep. 1, 2015

(54) INFORMATION PROCESSING SYSTEM, INFORMATION PROCESSING APPARATUS, STORAGE MEDIUM HAVING STORED THEREIN INFORMATION PROCESSING PROGRAM, METHOD OF EXECUTING APPLICATION, AND STORAGE MEDIUM STORED THEREIN DATA OF APPLICATION

(71) Applicant: NINTENDO CO., LTD., Kyoto (JP)

(72) Inventors: Hitoshi Sakai, Kyoto (JP); Jumpei Wada, Kyoto (JP); Masahiro Kondo, Kyoto (JP); Kei Yamashita, Kyoto (JP); Yuichi Awata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/055,149

(22) Filed: Oct. 16, 2013

(65) Prior Publication Data
US 2014/0137093 A1    May 15, 2014

(30) Foreign Application Priority Data

Nov. 15, 2012   (JP) ................................. 2012-251044

(51) Int. Cl.
*G06F 9/44* (2006.01)
*G06F 9/445* (2006.01)

(52) U.S. Cl.
CPC .......................................... *G06F 8/65* (2013.01)

(58) Field of Classification Search
None
See application file for complete search history.

(56) References Cited

U.S. PATENT DOCUMENTS 7,149,168 B2    12/2006  Kamon
2001/0047514 A1*  11/2001  Goto et al. ...................... 717/11

FOREIGN PATENT DOCUMENTS

JP    2004-063053    2/2004

* cited by examiner

*Primary Examiner* — Chuck Kendall
(74) *Attorney, Agent, or Firm* — Nixon & Vanderhye, P.C.

(57) ABSTRACT

An exemplary portable storage medium stores therein a program of an application. An exemplary information processing apparatus can execute the application. The storage medium stores a first data which is a program or data forming a part of the application and second data which is a program or data forming a part of the same application formed by the first data. The information processing apparatus reads the second data from the storage medium and installs the second data in the information processing apparatus. Further, the information processing apparatus starts and executes the application based on the first data stored in the storage medium and the installed second data.

16 Claims, 6 Drawing Sheets

F I G. 2
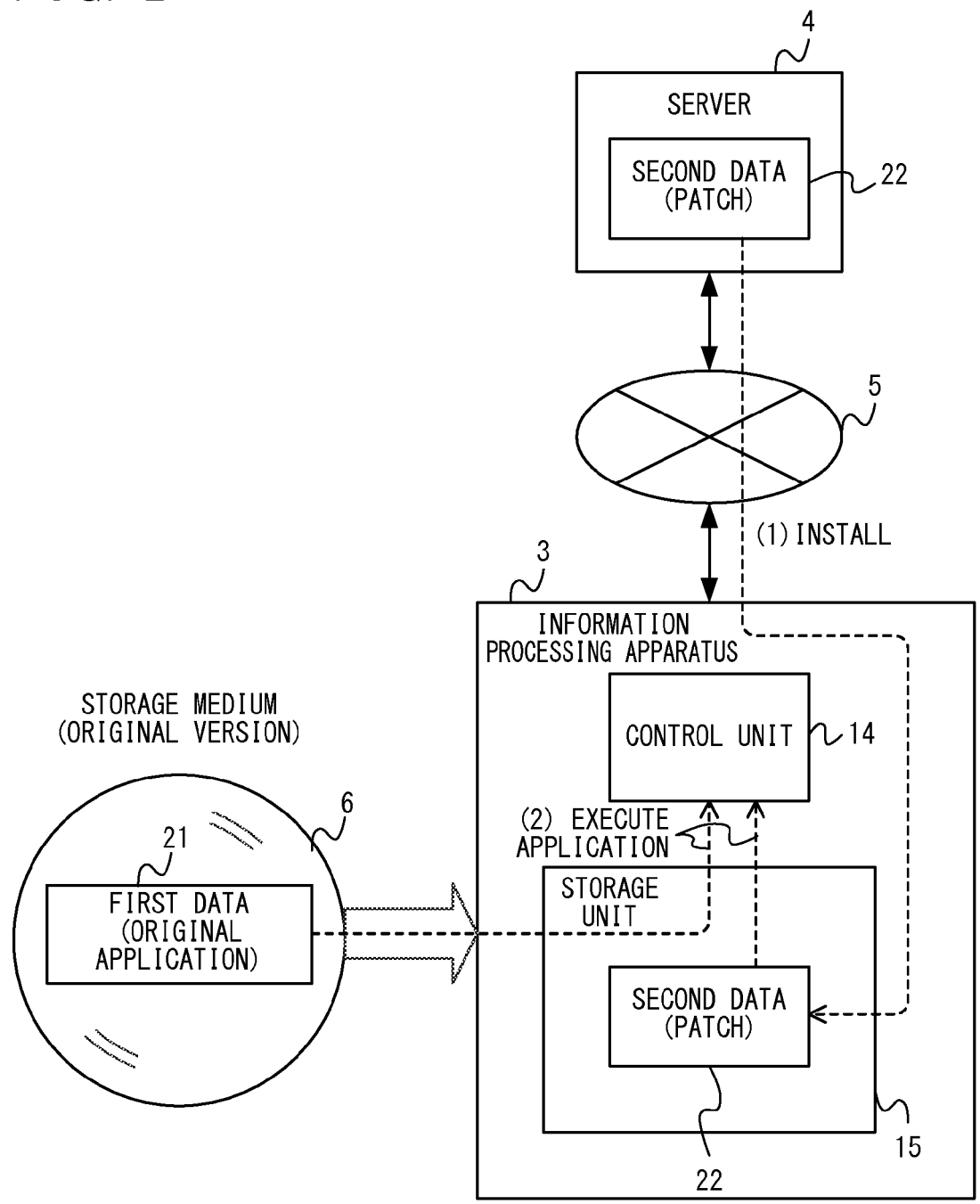

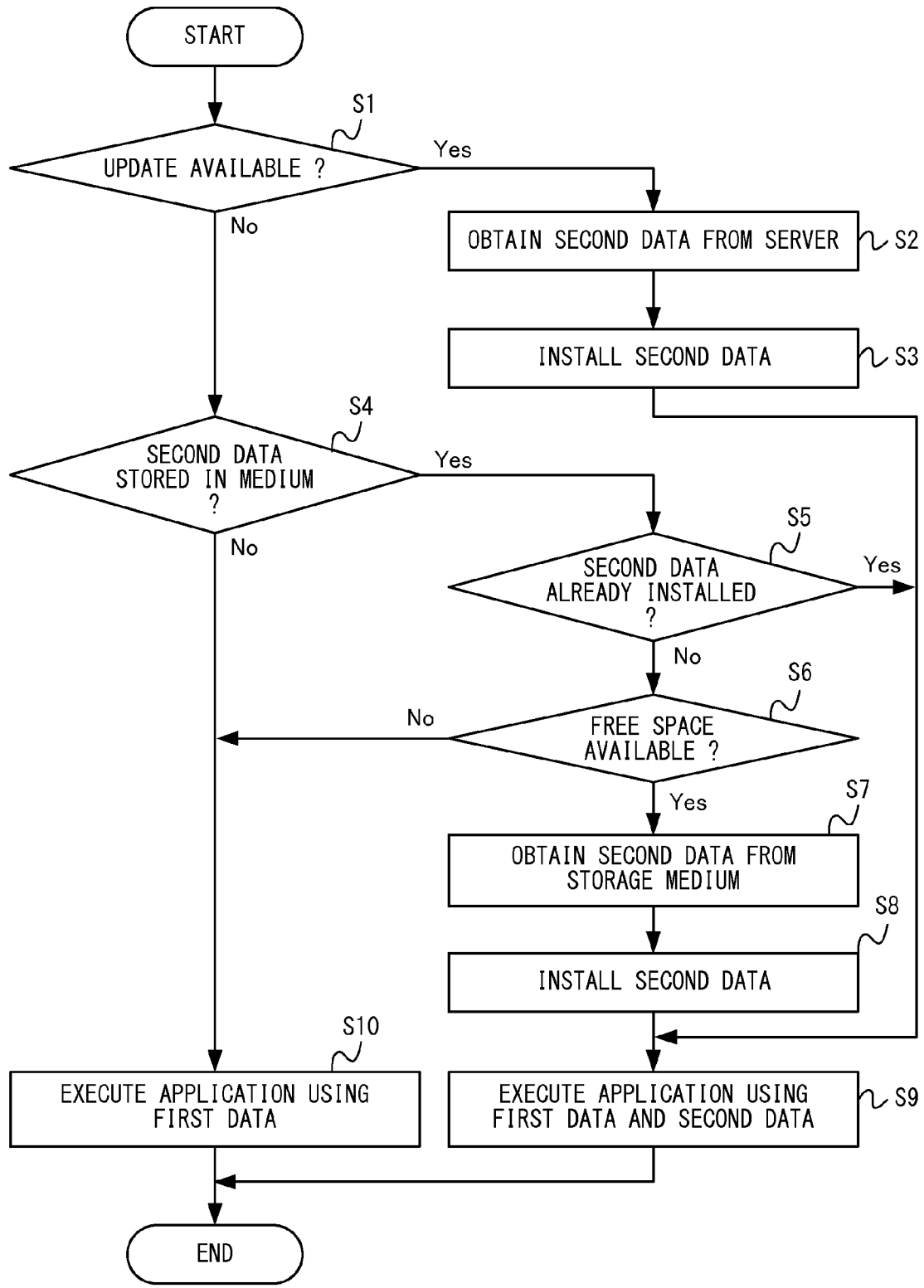
F I G. 7

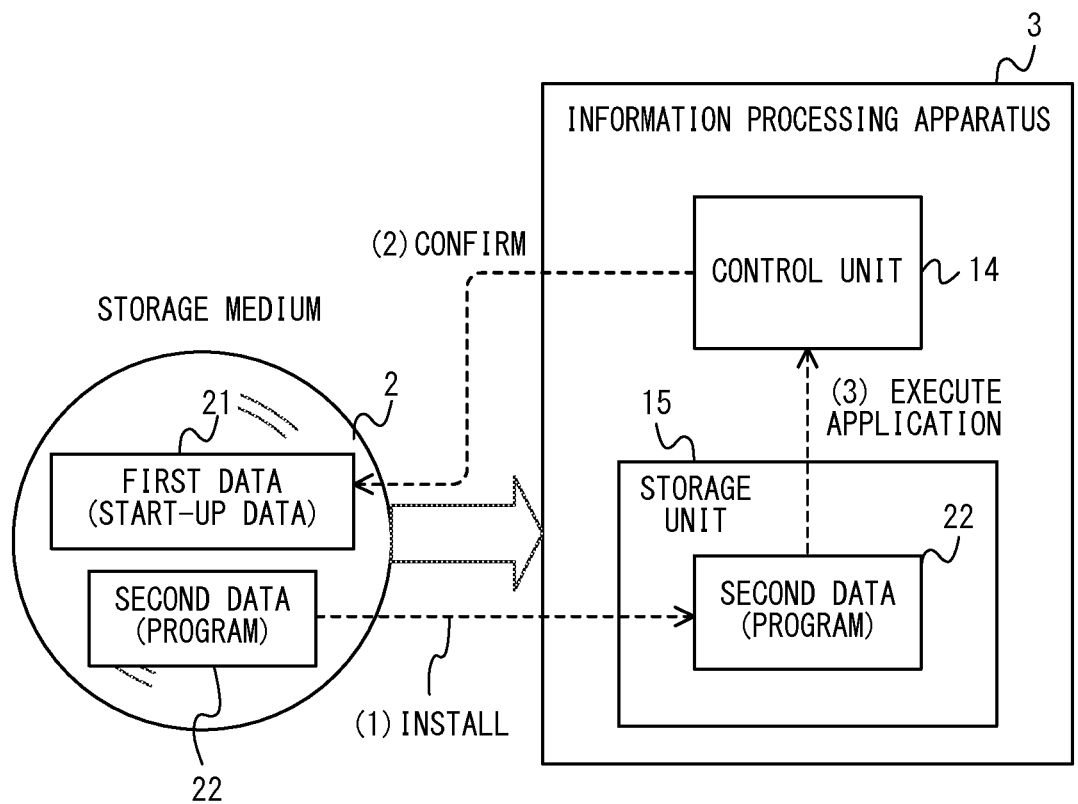
F I G. 8

INFORMATION PROCESSING SYSTEM, INFORMATION PROCESSING APPARATUS, STORAGE MEDIUM HAVING STORED THEREIN INFORMATION PROCESSING PROGRAM, METHOD OF EXECUTING APPLICATION, AND STORAGE MEDIUM STORED THEREIN DATA OF APPLICATION

CROSS REFERENCE TO RELATED APPLICATION

The disclosures of Japanese Patent Application No. 2012-251044, filed on Nov. 15, 2012, are incorporated herein by reference.

FIELD

The present technology relates to an information processing system, an information processing apparatus for executing an application, an storage medium having stored therein an information processing program, a method of executing the application, and a storage medium having stored therein data of the application.

BACKGROUND AND SUMMARY

Conventionally, there is a technology for, when an update is available for an application executed by an information processing apparatus, transmitting data (e.g., a patch file and the like) for updating the application to the information processing apparatus via a network.

An application can be provided by a method of providing the application from a server via a network, or a method of providing the application using a portable storage medium. In such a case where the application is provided using the storage medium, it is burdensome for a developer to create a program of the application to be stored in the storage medium.

Therefore, the present specification discloses an information processing system, an information processing apparatus which are capable of easily providing an application using a storage medium, a storage medium having stored therein an information processing program, a method of executing the application, and a storage medium having stored therein data of the application.

(1) An example of an information processing system described in the present specification includes a portable storage medium having stored therein a program of an application and an information processing apparatus capable of executing the application. The storage medium stores first data which is a program or data forming at least a part of the application and second data which is a program or data forming a part of the same application formed by the first data.

The information processing apparatus includes an install processing unit and an execution unit. The install processing unit reads the second data from the storage medium and installs the second data in the information processing apparatus. The execution unit starts and executes the application based on the first data stored in the storage medium and the installed second data.

The above "execution unit" may execute the application using the first data and the installed second data as in one exemplary embodiment described below, or may start an application using the first data and execute the application using the second data as in a modification described below.

According to the configuration of (1) described above, the storage medium stores the first data and the second data, and the information processing apparatus installs the second data and executes the application. Thus, a program of the application can be created simply by storing the first data and the second data in the storage medium, and this allows the workload on the developer of the application to be reduced. As a result, the application can be provided easily using the storage medium.

(2) The storage medium may store the program of the application as the first data and stores a program or data for making additions and/or changes to the program as the second data.

According to the configuration of (2) described above, the program or data for making additions and/or changes to the program of the first data is defined as the second data. Thus, in a case such as where the application is upgraded using the second data, the application into which the update has been reflected can be provided easily by the storage medium. For example, when a patch for upgrading the application is provided in a server, the workload on the developer can be reduced by using the patch as the second data.

(3) When a storage unit of the information processing apparatus does not have free data space for installing the second data, the execution unit may start and execute the application without using the second data but using the first data stored in the storage medium.

According to the configuration of (3) described above, even when the second data cannot be installed in the information processing apparatus, a user can use the application. Further, the workload on the developer can be reduced by intentionally not using the second data stored in the storage medium.

(4) The first data may be a program common to respective versions of the application. Further, the second data may be a program or data which differs for each version of the application.

According to the configuration of (4) described above, when the application is changed (upgraded) for a plurality of times, the developer can easily create the data of the application to be stored in the storage medium.

(5) The first data may be an initial version of the program of the application. Further, the second data may be patch data for upgrading the program of the first data.

According to the configuration of (5) described above, when the original program is upgraded using the patch data, the developer can easily create the data of the application to be stored in the storage medium.

(6) The execution unit may execute the application under a condition that the first data is referable or usable and execute the application using the second data together with the first data.

According to the configuration of (6) described above, the second data can be executed in the information processing apparatus under the condition that the second data is used together with the first data. Accordingly, even when the second data is illegally installed in another information processing apparatus, the application cannot be used without the storage medium (without the first data). Thus, according to the configuration of (6) described above, it is possible to prevent the application from being used illegally in a plurality of information processing apparatuses.

(7) The execution unit may enable start of the application under a condition that the first data is stored in the storage medium, and execute the application using the installed second data.

According to the configuration of (7) described above, the application program can be created more easily as compared to the case where data is read, during execution of the application, from both the storage unit in the information processing apparatus and the storage medium. Thus, the workload on the developer of the application can be reduced. Further, because the first data need not be read from the storage medium during the execution of the application, the information processing apparatus can perform the information processing concerning the application at high speed.

(8) The storage medium may be detachably attached to the information processing apparatus.

According to the configuration of (8) described above, the application can be provided to the information processing apparatus by means of the detachable storage medium.

(9) The information processing apparatus may further include a communication unit which obtains, when the second data is not installed, at least the same data as the second data from a predetermined server via a network. The install processing unit may install, when the second data is not installed, at least the data obtained from the server in the information processing apparatus.

According to the configuration of (9) described above, because the second data provided by the storage medium is the same as that provided by the server, the workload on the developer can be reduced.

(10) Another example of the information processing system described in the present specification is an information processing system capable of: accessing a portable storage medium having stored therein first data which is a program of an application; and executing the application. The information processing system includes a first obtaining unit, a second obtaining unit, and an execution unit. The first obtaining unit obtains, when second data which is a program or data for making additions and/or changes to the program of the first data can be obtained from a predetermined server via a network, the second data from the predetermined server. The second obtaining unit obtains, when the second data is stored in the storage medium, the second data from the storage medium. The execution unit starts and executes the application based on the first data stored in the storage medium and the obtained second data.

According to the configuration of (10) described above, similarly to the configuration of (1) described above, the workload on the developer of the application can be reduced, and the application can be provided easily using the storage medium. Further, because the second data provided by the storage medium is the same as that provided by the server, the developer need not create data for the storage medium. According to the configuration of (10) described above, the workload on the developer of the application can be reduced also by this reason. Further, according to the configuration of (10) described above, it is possible to increase opportunities for the information processing apparatus to obtain the second data, thereby allowing the user to more easily use the application after being updated.

(11) Further, an example of the information processing apparatus disclosed in the present specification is an information processing apparatus capable of executing a program of an application stored in a portable storage medium. The storage medium stores the program of the application and expansion data for making additions and/or changes to the application. The information processing apparatus includes an install processing unit and an execution unit. The install processing unit reads the expansion data from the storage medium and installs the expansion data in the information processing apparatus. The execution unit starts and executes the application based on the program of the application stored in the storage medium and the installed expansion data.

It is noted that the present specification discloses an information processing apparatus having the same functions as those of the information processing apparatuses in the information processing systems in the above (1) to (10), and discloses an information processing program which causes a computer to perform processes in the information processing apparatus. Furthermore, the present specification discloses a method of executing an application which is executed in the above (1) to (10). Still further, the present specification discloses a storage medium equivalent to that in the information processing systems in the above (1) to (9).

According to the information processing system, information processing apparatus, storage medium having stored therein an information processing program, method of executing an application, and storage medium having stored therein data of the application described above, the first data and the second data are stored in the storage medium, and the information processing apparatus installs the second data and executes the application. Thereby, the workload on the developer of the application can be reduced. As a result, it is possible to provide the application easily using the storage medium.

These and other objects, features, aspects and advantages of the exemplary embodiment will become more apparent from the following detailed description when taken in conjunction with the accompanying drawings.

BRIEF DESCRIPTION OF THE DRAWINGS

FIG. 2 is shows a non-limiting example of an operation of the information processing system performed when only first data is stored in a storage medium;

FIG. 7 is a flow chart showing a non-limiting example of a flow of information processing performed by a CPU of a control unit in the exemplary embodiment; and FIG. 8 shows a non-limiting example of an operation of an information processing system performed in a modification of the exemplary embodiment.

DETAILED DESCRIPTION OF NON-LIMITING EXAMPLE EMBODIMENTS

[1. Configuration of Information Processing System]

Figure 1:
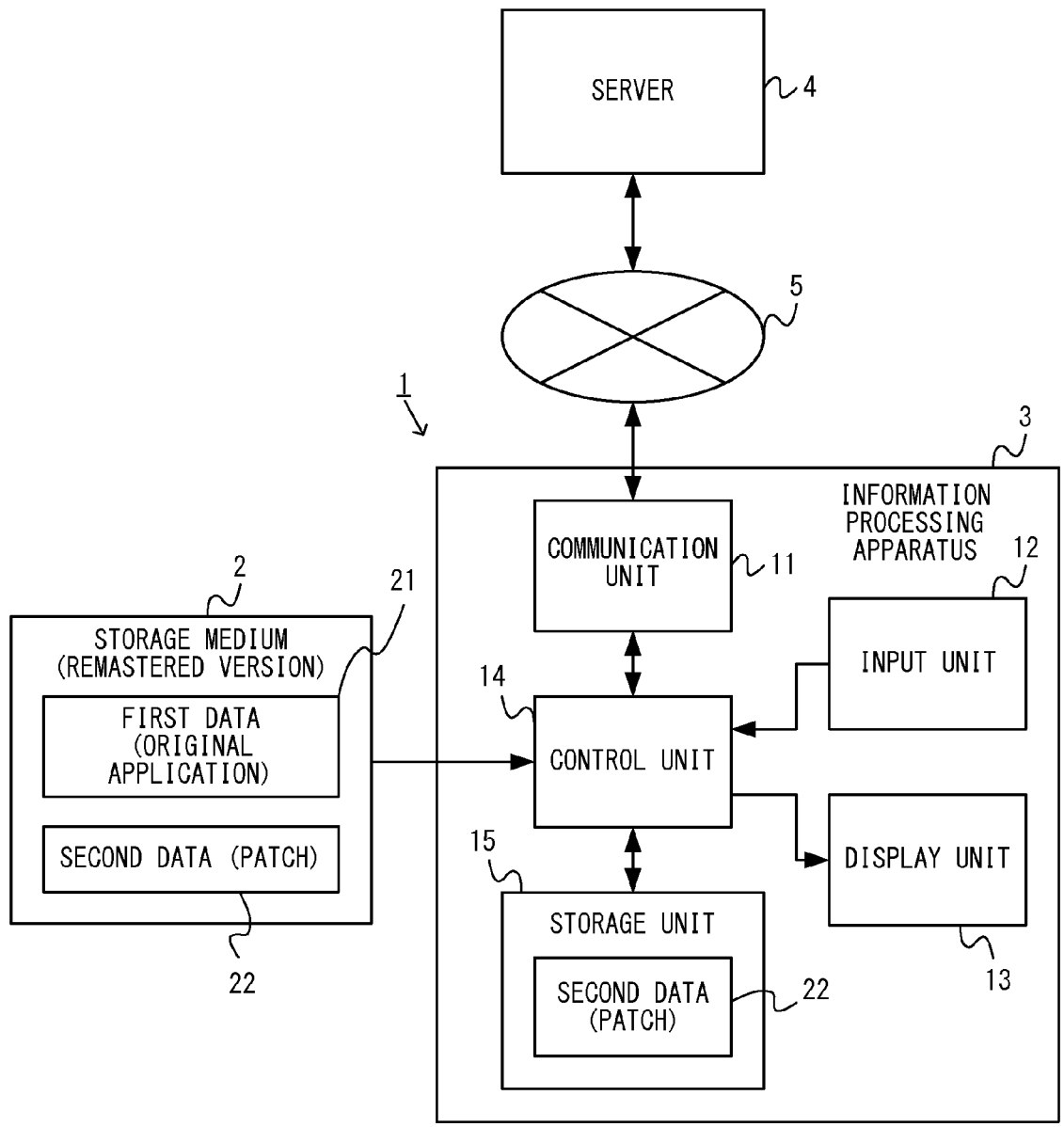
FIG. 1 is a block diagram showing a configuration of a non-limiting example of an information processing system.

Hereinafter, an information processing system, an information processing apparatus, an information processing program, a method of executing an application, and a storage medium according to the exemplary embodiment will be described. Firstly, description will be made on a configuration of the information processing system. FIG. 1 is a block diagram showing a configuration of an example of the information processing system. As shown in FIG. 1, an information processing system 1 includes a storage medium 2 and an information processing apparatus 3. The information processing apparatus 3 executes an application stored in the storage medium 2.

The storage medium 2 is portable and is, for example, a disk-type, card-type, or a stick-type storage medium. It should be noted that the information processing apparatus 3 may access the storage medium 2 by any method. For example, the information processing apparatus 3 may be able to access the storage medium 2 when the storage medium 2 is attached (inserted) to the information processing apparatus 3. Further, the information processing apparatus 3 may access the storage medium 2 by, for example, NFC (near-field communication) which enables the information processing apparatus 3 to access the storage medium 2 as the storage medium 2 comes in the proximity of the information processing apparatus 3.

The storage medium 2 stores data of an application. The application is a software executable by the information processing apparatus 3. The application may be any type of application such as, for example, a game application and the like.

The storage medium 2 stores first data 21 and second data 22 as the data of the application. The first data 21 is a program or data which forms at least a part of the application. The first data 21 is a program or data necessary for executing the application in the information processing apparatus 3. In the exemplary embodiment, the first data 21 is an original program of the application. It should be noted that the original program is an initial version of the program, that is, a program before the application is updated using the second data 22.

The second data 22 is a program or data which forms a part of the application. In the exemplary embodiment, the second data 22 is an expansion (or a correction) program or data (e.g., patch data) for making additions and/or changes to the original program.

The first data 21 and the second data 22 are stored separately in the storage medium 2. For example, when the storage medium 2 is a disk-type storage medium, the first data 21 may be stored in a sequentially readable storage area, and similarly, the second data 22 may be stored in a sequentially readable storage area. The first data 21 and the second data 22 may not necessarily be stored in successive storage areas.

The information processing apparatus 3 may be any information processing apparatus (or information processing system) capable of executing an application. The information processing apparatus 3 may be an information processing apparatus in any form such as a personal computer, a game apparatus, a mobile terminal, a smartphone, and the like. In the exemplary embodiment, the information processing apparatus 3 is implemented as a single apparatus. However, in another exemplary embodiment, functions of the information processing apparatus 3 may be realized by a plurality of apparatuses. For example, a terminal system including a main information processing apparatus which performs main information processing, and a terminal apparatus having an input unit and a display unit may be used instead of the information processing apparatus 3. Further, in another exemplary embodiment, at least a part of the information processing performed by the information processing apparatus 3 may be shared and performed by a plurality of apparatuses communicable with each other via a network (wide area network and/or local network).

The information processing apparatus 3 includes a communication unit 11. Here, as shown in FIG. 1, the information processing apparatus 3 is communicable with a server 4 via a network 5. The server 4 will be described later. The communication unit 11 transmits/receives data to/from the server 4 via the network 5.

The information processing apparatus 3 includes an input unit 12. The input unit 12 may be any input device which receives inputs from a user via buttons (keys), a touch panel, a mouse, and/or the like. Further, the information processing apparatus 3 includes a display unit 13. The display unit 13 displays an image generated by the information processing performed in the information processing apparatus 3.

The information processing apparatus 3 includes a control unit 14. The control unit 14 performs various information processes to be performed in the information processing apparatus 3. Specifically, the control unit 14 has a CPU, and the CPU executes a predetermined information processing program (in the exemplary embodiment, an information processing program 32 shown in FIG. 6), thereby performing the various information processes.

The information processing apparatus 3 includes a storage unit 15. The storage unit 15 may be any internal storage apparatus built in the information processing apparatus 3. In the exemplary embodiment, the storage unit 15 includes a first storage apparatus (e.g., a volatile working memory) for storing a program to be executed by the control unit 14 (CPU) and a second storage apparatus (e.g., a nonvolatile storage apparatus) for saving data.

The storage unit 15 stores the second data 22. The second data is installed in the information processing apparatus 3 from the storage medium 2. Here, to "install the second data in the information processing apparatus" means to put the second data into a state of being executable in the information processing apparatus. That is, in the present specification, for example, in addition to when a predetermined setting process is required to cause the second data to be executable in the information processing apparatus, when the second data is simply copied in the storage unit in the information processing apparatus, it is mentioned that "the second data is installed in the information processing apparatus". It should be noted that the second data 22 is stored in the second storage apparatus.

The server 4 can provide the information processing apparatus 3 with the second data 22. As will be described later in detail, when the storage medium (a storage medium 6 shown in FIG. 2) which stores the first data only becomes readable by the information processing apparatus 3, the information processing apparatus 3 obtains the second data 22 from the server 4. The server 4 includes one or more information processing apparatuses (server apparatuses). For example, a server apparatus may be provided for each type (version) of the second data 22, or may be provided for each application. In these cases, a group of the server apparatuses is referred to as server 4.

[2. Outline of Operation]

Next, an outline of an operation performed in the information processing system 1 will be described. In the following, firstly description will be made on an operation performed when a storage medium (e.g., a storage medium which stores only an original program before correction) which stores the first data 21 only becomes accessible (readable) by the information processing apparatus 3. Then, description will be made on an operation performed when a storage medium (e.g., a storage medium which stores the original program and a correction patch) which stores the first data 21 and the second data 22 becomes accessible by the information processing apparatus 3.

(2-1: Operation Performed When Only First Data is Stored in Storage Medium)

FIG. 2 shows an example of an operation of the information processing system 1 performed when only the first data 21 is stored in a storage medium. In FIG. 2, unlike the storage medium 2, the storage medium 6 stores the first data 21 only.

That is, the storage medium 6 stores the original version of the application program for which an update using a patch and the like is not made ready.

In the exemplary embodiment, when the information processing apparatus 3 is communicable with the server 4 via the network 5, the information processing apparatus 3 determines whether or not an update is available for an application (application executable by the information processing apparatus 3) in the storage medium 6. Then, when it has determined that the update is available, the information processing apparatus 3 obtains data (the second data 22) for updating a program of the application from the server 4. It should be noted that availability of an update may be determined at any timing. For example, the information processing apparatus 3 determines availability of an update for an application with respect to which an instruction for starting has been issued, at timing when the start instruction is issued. When the second data is obtained, the information processing apparatus 3 installs the second data 22 ((1) shown in FIG. 2). The information processing apparatus 3 may store the second data 22 in the nonvolatile one of the storage apparatuses of the storage unit 15, so that the information processing apparatus 3 need not obtain the second data 22 every time the application is executed.

When an application is executed, the information processing apparatus 3 executes the application using the first data 21 stored in the storage medium 6 and the second data 22 having been installed ((2) shown in FIG. 2). For example, the information processing apparatus 3 may read the first data 21, and develop the read first data 21 in a memory (the first storage apparatus) while changing the first data 21 by using the second data 22 as necessary. Further, for example, the information processing apparatus 3 may execute the second data 22 having been installed, as necessary, while executing the first data 21 stored in the storage medium 6, thereby executing the program into which the update has been reflected. As described above, the application into which the update has been reflected is executed. It should be noted that when a part of the first data 21 necessary for executing an application is read by the memory, as appropriate, during execution of the application, the content of the memory may be changed as appropriate. Further, the data stored (developed) in the memory using the first data 21 and the second data 22 may be deleted after the execution of the application is ended, or may be stored in the volatile one of the storage apparatuses of the storage unit 15.

As described above, in the exemplary embodiment, when an application is executed using the storage medium storing the original version, the second data 22 obtained from the server 4 is installed in the information processing apparatus 3. Then, the application is updated using the second data 22 having been installed. It should be noted that the information processing apparatus 3 may not necessarily have a function of communicating with the server 4. In this case, the information processing apparatus 3 can obtain the second data 22 from the storage medium 2 as will be described later.

(2-2: Operation Performed When First Data and Second Data are Stored in Storage Medium)

Figure 3:
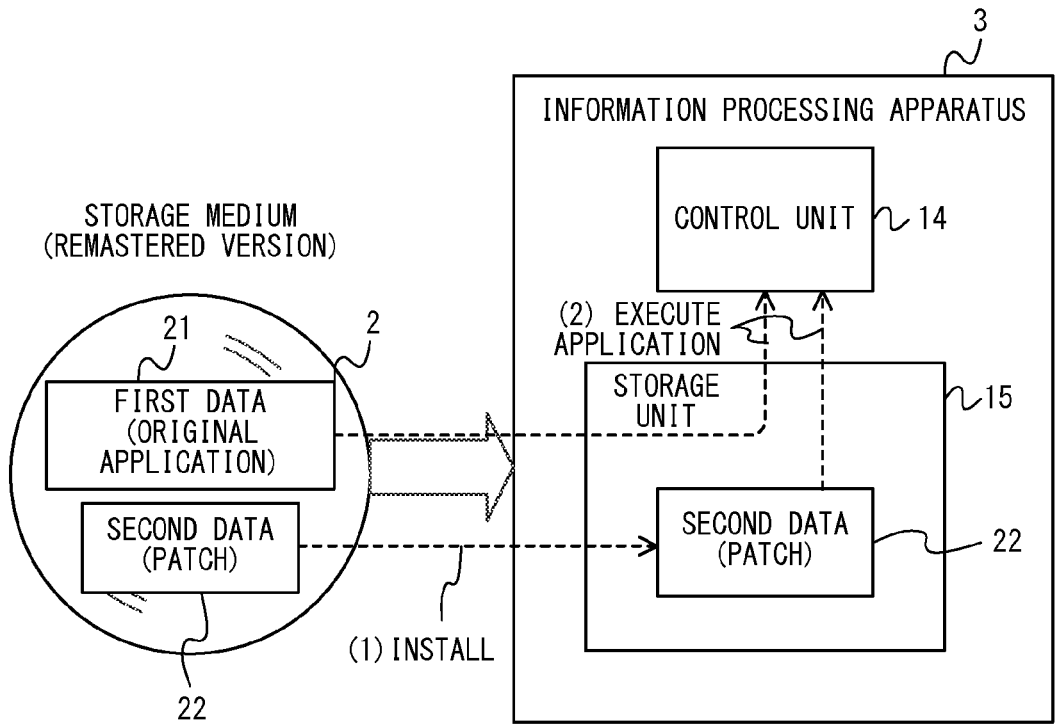
FIG. 3 shows a non-limiting example of an operation of the information processing system performed when the first data and second data are stored in the storage medium.

FIG. 3 shows an example of an operation of the information processing system 1 performed when the first data 21 and the second data 22 are stored in a storage medium. In FIG. 3, the storage medium 2 stores, as those shown in FIG. 1, the first data 21 and the second data 22. That is, the storage medium 2 stores a remastered version of the application program for which an update using a patch and the like is made ready. By providing the application using the storage medium containing the second data 22, the information processing apparatus 3 which does not have a function of connecting to the network 5 can be provided with the application into which the update has been reflected.

When the storage medium 2 is accessible, the information processing apparatus 3 obtains the second data 22 from the storage medium 2 as necessary. The control unit 14 reads the second data 22 from the storage medium 2 and installs the second data 22 in the information processing apparatus 3 ((1) shown in FIG. 3). It should be noted that the information processing apparatus 3 may obtain the second data 22 at any timing. Further, the second data 22 is installed before the application is executed. That is, the application is executed after installation of the second data 22 is completed. For example, the control unit 14 may obtain the second data 22 when the storage medium 2 becomes accessible by the information processing apparatus 3 for the first time, and save the second data 22 in the storage unit 15. Further, for example, the control unit 14 may obtain the second data 22 each time the application is executed, and delete the second data 22 when the application is ended.

As described above, in the exemplary embodiment, the second data 22 is installed in the information processing apparatus 3. That is, the information processing apparatus 3 is put into the same state as when the second data 22 is obtained from the server 4. Thus, even when the second data 22 is obtained from the storage medium 2, the information processing apparatus 3 can execute an application in the same manner as in the operation performed when the second data 22 is obtained from the server 4. That is, when an application is executed, the information processing apparatus 3 executes the application using the first data 21 stored in the storage medium 2 and the second data 22 having been installed ((2) shown in FIG. 3).

As described above, in the exemplary embodiment, when the first data 21 and the second data 22 are stored in the storage medium 2, the information processing apparatus 3 can execute an application in the same manner as in the operation performed when the second data 22 is obtained from the server 4. Here, as a method of providing, by means of the storage medium, an application into which an update has been reflected using the second data 22, there is a method of newly creating a remastered version of the application program into which the update has been reflected and providing the created application program by means of the storage medium. However, in this method, the remastered version of the application program has to be newly created and thus the workload on the developer of the application is increased.

On the other hand, according to the exemplary embodiment, creating a remastered version of an application is an easy task, because it is only necessary to add the second data 22 provided by the server 4 to the first data 21 which is the same as the original version. That is, according to the exemplary embodiment, the workload on the developer when changing the original version to a remastered version can be decreased, and the application into which the update has been reflected can easily be provided by means of the storage medium.

Further, in the exemplary embodiment, the information processing apparatus 3 can obtain the second data 22 from both the server 4 and the portable storage medium 2. That is, when the information processing apparatus 3 can obtain the second data 22 from a predetermined server 4 via the network 5, the information processing apparatus 3 obtains the second data 22 from the predetermined server 4. Further, when the second data 22 is stored in the storage medium 2, the information processing apparatus 3 obtains the second data 22 from the storage medium 2. Then, the information processing apparatus installs the second data having been obtained (by any of the above methods). Thus, it is possible to increase opportunities for the information processing apparatus to obtain the second data, thereby allowing the user to more easily use the application after being updated.

(Operation Performed When Second Data cannot be Installed)

In the exemplary embodiment, because the second data 22 is installed in the information processing apparatus 3, free space is needed in the storage unit 15 for storing the second data 22. Here, in the exemplary embodiment, when the second data 22 cannot be installed due to lack of free space in the storage unit 15, the information processing apparatus 3 executes an application without using the second data 22 but using the first data 21.

Figure 4:
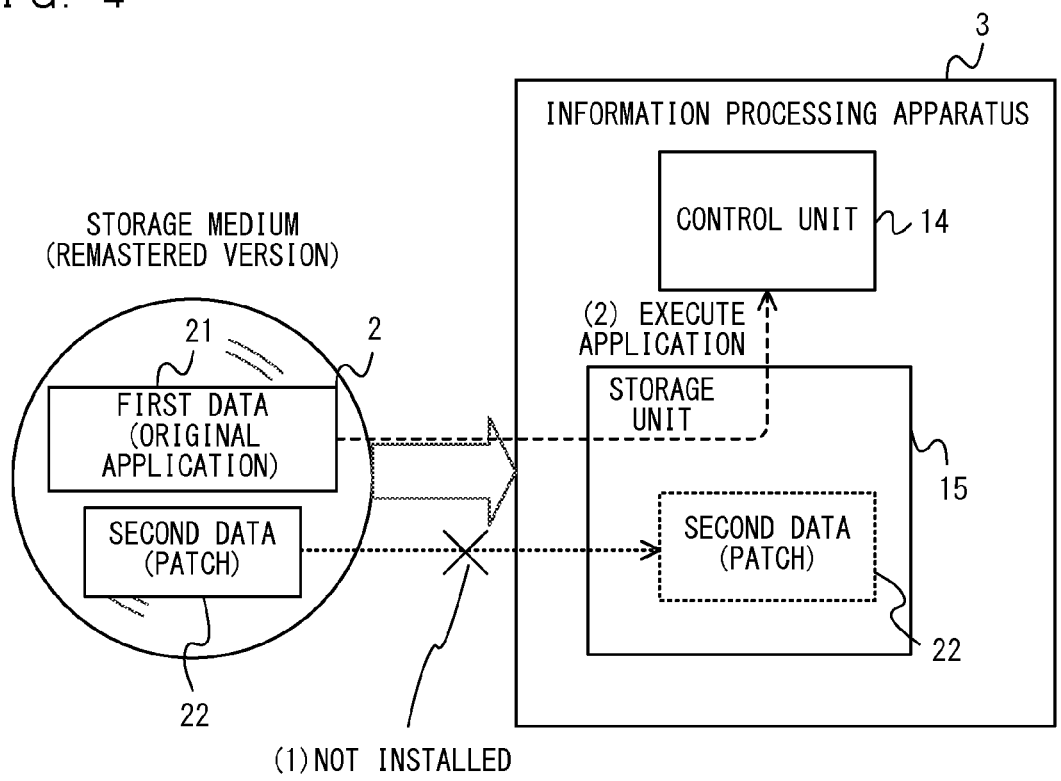
FIG. 4 shows a non-limiting example of an operation of the information processing system performed when the second data cannot be installed.

FIG. 4 shows an example of an operation of the information processing system 1 performed when the second data cannot be installed. When the second data 22 cannot be installed due to lack of free space in the storage unit 15, the information processing apparatus 3 does not install the second data 22 as shown in FIG. 4. It should be noted that, at this time, the information processing apparatus 3 may notify the user that the second data 22 cannot be installed due to lack of free space (that the application after being updated cannot be used). Further, at this time, the information processing apparatus 3 may give the user a chance to increase the free space (delete other files) in the storage unit 15. Then, the information processing apparatus 3 may install the second data 22 when free space enough for storing the second data 22 is created.

When an application is executed in a state where the second data 22 is not installed, the information processing apparatus 3 executes the application using the first data 21 stored in the storage medium 2 ((2) shown in FIG. 4). Thus, in this case, the application before the update is reflected is executed.

As described above, in the exemplary embodiment, when the storage unit 15 does not have free data space for installing the second data 22, the information processing apparatus 3 starts and executes the application without using the second data 22 but using the first data 21 stored in the storage medium 2. Thus, even when the second data 22 cannot be installed, the user can use the application.

In the case shown in FIG. 4, the information processing apparatus 3 may also use a method of executing the application using the second data 22 stored in the storage medium 2 together with the first data 21. However, when executing the application, because of a reason such as a difference between a reading speed when reading the second data 22 stored in the information processing apparatus 3 and a reading speed when reading the second data 22 stored in the storage medium 2, the information processing apparatus 3 may not operate in the same manner in the two cases. Thus, in the above method, a verification work (operation checking work) for verifying whether the information processing apparatus 3 works normally is assigned to the developer of the application, thereby increasing the workload on the developer. On the other hand, in the exemplary embodiment, when the second data 22 cannot be installed, the second data 22 is not used so that the workload on the developer is not increased.

In another exemplary embodiment, when the second data 22 cannot be installed, the information processing apparatus 3 may prohibit execution of the application. Thereby, similarly to the exemplary embodiment, the workload on the developer can be suppressed.

(2-3: First Data and Second Data)

Next, the first data 21 and the second data 22 will be described. The first data 21 is a program or data necessary for executing an application. That is, the information processing apparatus 3 executes the application under a condition that the first data 21 stored in the storage medium 2 is referable or usable. Thus, even when the second data 22 is installed in the information processing apparatus 3, in order for the application to be executed in the information processing apparatus 3, the storage medium 2 storing the first data 21 is needed. For example, even if the second data 22 is installed in another information processing apparatus using the storage medium 2, the application cannot be used without the storage medium 2. Thus, it is possible to prevent the application from being used illegally in a plurality of information processing apparatuses.

Further, in the exemplary embodiment, the second data 22 can be executed in the information processing apparatus 3 under a condition that the second data 22 is used together with the first data 21. Thus, even if the second data 22 is installed in another information processing apparatus (using the storage medium 2), the second data 22 cannot be used without the storage medium 2. Thus, it is possible to prevent the application (the second data 22) from being used illegally in a plurality of information processing apparatuses.

In another exemplary embodiment, for example, the second data 22 may be solely executable (without the first data 21). In this case, when the second data 22 is executed without the first data 21, the function of the application may be limited.

It should be noted that, in the exemplary embodiment, the first data 21 is an original application program. Further, the second data 22 is a program or data (e.g., a patch) for making additions and/or changes to the program of the first data 21. Thus, in the exemplary embodiment, in such a case when the application is upgraded using the patch, the application into which the update has been reflected can be easily provided by the storage medium.

In another exemplary embodiment, the first data 21 and the second data 22 are not limited to the original program and the patch. For example, the first data 21 and the second data 22 may be those described later in "[4. Modification]".

Figure 5:
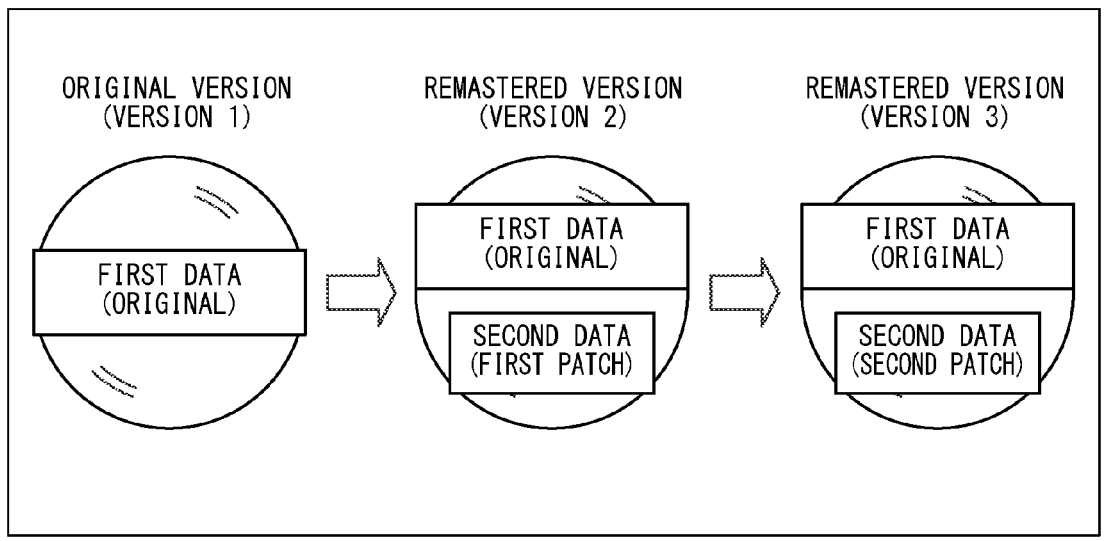
FIG. 5 shows a non-limiting example of a relationship between versions of an application and the first and second data.

FIG. 5 shows an example of a relationship between versions of an application and the first and second data. In FIG. 5, a patch for making changes to the original program (the first data 21) is provided for each version. That is, in a storage medium storing a version 2 which is obtained by adding changes to a version 1 of the original program for the first time, the original program is stored as the first data 21, and a first patch for adding the changes to the first data 21 is stored as the second data 22. Further, in a storage medium storing a version 3 which is obtained by adding changes to the original program for the second time, the original program is stored as the first data 21, and a second patch for making the changes to the first data 21 is stored as the second data 22. It should be noted that the second patch may be formed of the first patch and a patch for changing the version 2 to the version 3, or may be formed of a patch for changing the version 1 to the version 3.

As described above, in a storage medium for providing an application, the common program (original program) of the versions of the application may be stored as the first data 21, and a program or data which differs for each version of the application may be stored as the second data 22. Thus, even when changes (upgrades) are added to an application for a plurality of times, it is possible for the developer to easily create data of the application to be stored in a storage medium.

[3. Details of Process Performed in Information Processing System]

Figure 6:
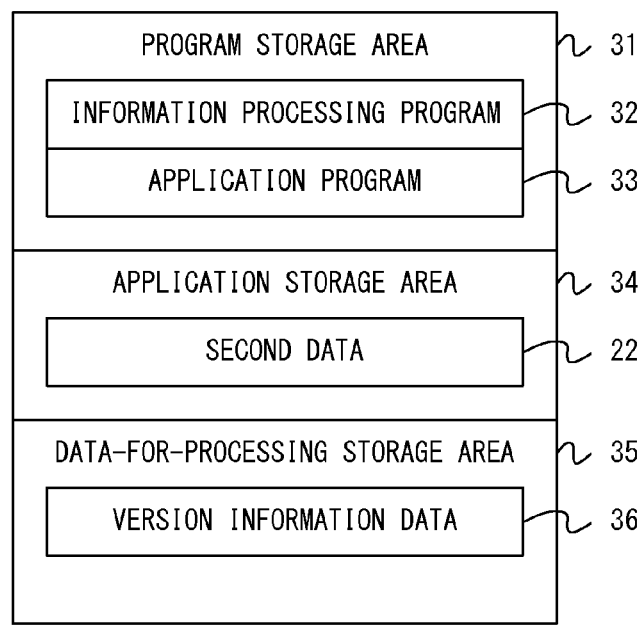
FIG. 6 shows a non-limiting example of data areas set in a storage unit of the information processing apparatus in the exemplary embodiment.

(3-1: Data Used in Information Processing) In the following, an example of specific processes performed in the information processing system 1 (the information processing apparatus 3) in the exemplary embodiment will be described with reference to FIG. 6 and FIG. 7. FIG. 6 shows an example of data areas set in the storage unit 15 of the information processing apparatus 3 in the exemplary embodiment. As shown in FIG. 6, the storage unit 15 of the information processing apparatus 3 includes a program storage area 31, an application storage area 34, and a data-for-processing storage area 35. In the storage unit 15, in addition to the data shown in FIG. 6, images to be outputted to the display unit 13, image data used for generating the images, and the like are stored.

The program storage area 31 is an area for storing programs executed by the CPU of the control unit 14. The program storage area 31 stores the information processing program 32. The information processing program 32 is a program executed by the computer (the control unit 14) of the information processing apparatus 3. A part of or the entire information processing program 32 may be prestored in the information processing apparatus 3 having the control unit 14, or may be obtained from the outside of the information processing apparatus 3. When the processes shown in FIG. 7 are performed, a part of or the entire information processing program 32 is read by a memory (the storage unit 15) at an appropriate timing and executed by the CPU.

Further, when an application is executed, an application program 33 may be stored in the program storage area 31. In the exemplary embodiment, a program based on the first data 21 and the second data 22 may be stored as the application program 33.

The application storage area 34 stores the second data 22. It should be noted that although only a single application is shown in FIG. 6, pieces of the second data may be stored for a plurality of applications, respectively in the application storage area 34.

The data-for-processing storage area 35 stores various data used in the information processing (the information processing shown in FIG. 7) performed in the information processing apparatus 3. The data-for-processing storage area 35 stores version information data 36. The version information data 36 is data representing a version of an application. In the exemplary embodiment, the information processing apparatus 3 obtains version information of an application which is currently executable by the information processing apparatus 3 and stores the version information in the storage unit 15 in advance.

(3-2: Specific Example of Information Processing)

Next, a detailed flow of the information processing in the exemplary embodiment will be described. FIG. 7 is a flow chart showing an example of a flow of information processing performed by the CPU of the control unit 14 in the exemplary embodiment. In the exemplary embodiment, when the information processing apparatus 3 is started, the CPU of the control unit 14 initializes the memory and the like, and loads the information processing program 32 into the memory. Then, the CPU starts to execute the information processing program 32.

Processes in respective steps in the flow chart shown in FIG. 7 are only examples. The order of the process steps may be interchanged as long as similar results can be obtained. In addition to (or instead of) the above process steps, another process may be performed. Further, in the exemplary embodiment, the respective process steps in the flow chart are performed by the CPU of the control unit 14. However, a part of the process steps may be performed by a processor other than the CPU or a dedicated circuit.

The information processing shown in FIG. 7 is started in response to, for example, an instruction to start an application performed by the user. In the exemplary embodiment, the information processing is started by the user performing an operation to designate an icon representing an application in the menu image, in a state where the menu image is being displayed on the display unit 13.

In step S1, the control unit 14 accesses the server 4 and determines whether or not the application can be updated. A determination process of step S1 is a process of making determination whether or not the information processing apparatus 3 can access the server 4 and determination whether or not an update to the application is available in the server 4. That is, when the information processing apparatus 3 can access the server 4 and an update to the application is available, the control unit 14 makes an affirmative determination in step S1. The determination whether or not an update to an application is available is made based on, for example, whether version information of the application obtained from the server 4 is newer than the current version information of the application in the information processing apparatus 3. It should be noted that the control unit 14 recognizes the current version information of the application in the information processing apparatus 3 by referring to the version information data 36 stored in the storage unit 15. When a determination result of step S1 is affirmative, a process of step S2 is performed. Meanwhile, when the determination result of step S1 is negative, a process of step S4 described below is performed.

In step S2, the control unit 14 obtains the second data 22 from the server 4. That is, the control unit 14 receives the second data from the server 4 via the network 5 by means of the communication unit 11. In the subsequent step S3, the control unit 14 installs the obtained second data 22. That is, the second data 22 is stored in the storage unit 15. When an old version of the second data 22 is already stored in the storage unit 15, the content of the second data 22 stored in the storage unit 15 is updated to that of the newly obtained second data 22. Subsequently to step S3, the control unit 14 performs a process of step S9 described below.

In step S4, the control unit 14 determines whether the second data 22 is stored in the storage medium 2. The process of step S4 is a process of making determination whether an original version of the application is stored or a remastered version of the application is stored in the storage medium 2. When a determination result of step S4 is affirmative, a process of step S5 is performed. Meanwhile, when the determination result of step S4 is negative, a process of step S10 described below is performed.

In step S5, the control unit 14 determines whether the second data 22 has already been installed. In the determination of step S5, the control unit 14 determines that the second data 22 has already been installed, in addition to when the second data 22 has already been obtained from the storage medium 2, when the second data of the same version as or a newer version than the second data 22 stored in the storage medium 2 has been obtained from the server 4. When a determination result of step S5 is affirmative, the process of step S9 described below is performed. Meanwhile, when the determination result of step S5 is negative, a process of step S6 is performed.

In step S6, the control unit 14 determines whether the storage unit 15 has free space for storing the second data 22. A process of step S6 is a process of making determination whether the second data 22 can be installed. When a determination result of step S6 is affirmative, a process of step S7 is performed. Meanwhile, when the determination result of step S5 is negative, the process of step S10 described below is performed.

In step S7, the control unit 14 obtains the second data 22 from the storage medium 2. That is, the control unit 14 reads the second data 22 from the storage medium 2. In the subsequent step S8, the control unit 14 installs the obtained second data 22. That is, the second data 22 is stored in the storage unit 15 (various settings are made as necessary so that the second data 22 is made ready to be used). Subsequently to step S8, the control unit 14 performs the process of step S9.

In step S9, the control unit 14 executes the application using the first data 21 in the storage medium 2 and the installed second data 22. Specifically, the application is executed based on the method described in "(2-1: Operation Performed When Only First Data is Stored in Storage Medium)" described above. Subsequently to step S9, in response to end of the execution of the application, the control unit 14 ends the information processing shown in FIG. 7.

In step S10, the control unit 14 executes the application using the first data in the storage medium 2. Specifically, the application is executed based on the method described in "(Operation Performed When Second Data cannot be Installed)" described above. Subsequently to step S10, in response to the end of the execution of the application, the control unit 14 ends the information processing shown in FIG. 7.

It should be noted that, among the processes shown in FIG. 7, a part of or the entire processes of S1 to S8 may be performed at timings other than during the application is being executed. For example, the processes (step S1 to S3) relative to obtaining the second data 22 from the server 4 may be performed when the information processing apparatus 3 is started. Further, for example, the processes (step S4 to S8) relative to obtaining the second data 22 from the storage medium 2 may be performed when the storage medium 2 becomes accessible by the information processing apparatus 3 (when the information processing apparatus 3 recognizes the storage medium 2).

[4. Modification]

In the exemplary embodiment, the case where an application is executed using both the first data 21 and the second data 22 has been described as an example. Here, in another exemplary embodiment, the information processing apparatus 3 may execute an application using only the second data 22 and use the first data 21 only as a condition for starting the application. In the following, a case where the information processing apparatus 3 executes an application using only the second data 22 will be described as a modification of the exemplary embodiment.

FIG. 8 shows an example of an operation performed in an information processing system in the modification of the exemplary embodiment. As shown in FIG. 8, the first data 21 stored in the storage medium 2 in the present modification is data (start-up data) used for starting an application. Specifically, the content of the start-up data may be any content. The start-up data may be, for example, data of identification information (title information) of the application, data of an icon of the application displayed in the menu image, key data for decoding the second data 22 (when the second data is encrypted), and/or the like.

Further, the second data 22 stored in the storage medium 2 in the present modification is a program of the application. In the present modification, a program of the second data 22 can bet executed, not with the first data 21, but solely.

In the present modification, similarly to the exemplary embodiment, the information processing apparatus 3 firstly reads the second data 22 from the storage medium 2 and installs the second data 22 in the storage unit 15 ((1) shown in FIG. 8). It should be noted that the second data 22 may be installed at any timing For example, the second data 22 may be installed at a timing when the storage medium 2 becomes accessible by the information processing apparatus 3.

When an application is executed, the information processing apparatus 3 enables (allows) start of the application under a condition that the first data 21 is stored in the storage medium 2. That is, the control unit 14 accesses the storage medium 2 and confirms that the first data 21 is stored (in other words, that the storage medium 2 which stores the first data 21 is accessible) ((2) shown in FIG. 8). Then, when the control unit has confirmed that the first data 21 is stored, the control unit 14 executes the application using the installed second data 22.

The method of allowing start of the application with the first data 21 as a condition may be any method. For example, the information processing apparatus 3 may display an icon of the application in the menu image using the first data 21, and execute the application when the icon is designated. Thus, because the icon cannot be displayed in the menu image unless the first data 21 is obtained, start of the application can be prohibited. Further, for example, in response to an instruction to start the application, the information processing apparatus 3 may automatically access the storage medium 2. Then, the information processing apparatus 3 may not start the application when there is no accessible storage medium 2 or when the first data 21 is not stored in the storage medium 2.

In the present modification, an application is executed not using the first data 21 but using the installed second data 22 ((3) shown in FIG. 8). That is, during the application is being executed, the control unit 14 does not use the first data and thus need not access the storage medium 2. It should be noted that, when an application is executed, the second data 22 may be developed in a memory (the first storage apparatus described above) as appropriate and executed.

According to the modification, the first data 21 need not be read from the storage medium 2 during the application is being executed, thereby allowing the information processing apparatus 3 to perform the information processing concerning the application at high speed. Further, the application program can be created more easily as compared to the case where data is read, during execution of the application, from both the storage unit 15 in the information processing apparatus and the storage medium 2. Thus, the workload on the developer can be reduced.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the objective of the exemplary embodiment is such as to provide an application easily using a storage medium, and the exemplary embodiment can be used as an information processing apparatus, an information processing terminal, or the like for executing various applications such as a game application.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus capable of executing a program of an application stored in a portable storage medium,
    the storage medium having stored therein the program of the application and expansion data for making additions and/or changes to the application,
    the information processing apparatus comprising:
        an install processing unit configured to read the expansion data from the storage medium and install the expansion data in the information processing apparatus; and
        an execution unit configured to start and execute the application using the program of the application remotely-stored in the portable storage medium and the locally-installed expansion data, wherein
    the program of the application stored in the portable storage medium is executed without being installed in the information processing apparatus.

2. An information processing system including a portable storage medium having stored therein a program of an application and an information processing apparatus capable of executing the application, wherein
    the storage medium stores first data which is a program or data forming at least a part of the application and second data which is a program or data forming a part of the same application formed by the first data,
    the information processing apparatus comprises:
        an install processing unit configured to read the second data from the storage medium and install the second data in the information processing apparatus; and
        an execution unit configured to start and execute the application using the first data remotely-stored in the portable storage medium and the locally-installed second data, and
    the first data stored in the portable storage medium is executed without being installed in the information processing system.

3. The information processing system according to claim 2, wherein
    the storage medium stores the program of the application as the first data, and stores a program or data for making additions and/or changes to the program as the second data.

4. The information processing system according to claim 3, wherein
    when a storage unit of the information processing apparatus does not have free data space for installing the second data, the execution unit starts and executes the application without using the second data but using the first data stored in the storage medium.

5. The information processing system according to claim 3, wherein
    the first data is a program common to respective versions of the application, and
    the second data is a program or data which differs for each version of the application.

6. The information processing system according to claim 3, wherein
    the first data is an initial version of the program of the application, and
    the second data is patch data for upgrading the program of the first data.

7. The information processing system according to claim 2, wherein
    the execution unit: executes the application under a condition that the first data is referable or usable; and executes the application using the second data together with the first data.

8. The information processing system according to claim 2, wherein
    the execution unit enables start of the application under a condition that the first data is stored in the storage medium, and executes the application using the installed second data.

9. The information processing system according to claim 2, wherein
    the storage medium is detachably attached to the information processing apparatus.

10. The information processing system according to claim 2, wherein
    the information processing apparatus further comprises
        a communication unit configured to obtain, when the second data is not installed, at least the same data as the second data from a predetermined server via a network, and
    the install processing unit installs, when the second data is not installed, at least the data obtained from the server in the information processing apparatus.

11. An information processing system capable of: accessing a portable storage medium having stored therein first data which is a program of an application; and executing the application, the information processing system comprising:
    a first obtaining unit configured to obtain, when second data which is a program or data for making additions and/or changes to the program of the first data can be obtained from a predetermined server via a network, the second data from the predetermined server;
    a second obtaining unit configured to obtain, when the second data is stored in the storage medium, the second data from the storage medium; and
    an execution unit configured to start and execute the application using the first data remotely-stored in the storage medium and the obtained second data, wherein the first data stored in the portable storage medium is executed without being installed in the information processing system.

12. An information processing apparatus capable of executing a program of an application stored in a portable storage medium, the storage medium having stored therein: first data which is a program or data forming at least a part of the application; and second data which is a program or data forming a part of the same application formed by the first data, the information processing apparatus comprising:

an install processing unit configured to, when the storage medium becomes readable by the information processing apparatus, read the second data from the storage medium and install the second data in the information processing apparatus; and an execution unit configured to start and execute the application using the first data separately stored in the storage medium and the installed second data, wherein the first data stored in the portable storage medium is executed without being installed in the information processing apparatus.

13. The information processing apparatus according to claim 12, further comprising a communication unit configured to obtain, when the second data is not installed, at least the same data as the second data from a predetermined server via a network, wherein when the second data is not installed, the install processing unit installs at least the data obtained from the server in the information processing apparatus.

14. A computer-readable non-transitory storage medium having stored therein an information processing program executed by a computer of an information processing apparatus capable of executing a program of an application stored in a portable storage medium, wherein the portable storage medium stores first data which is a program or data forming at least a part of the application and second data which is a program or data forming a part of the same application formed by the first data, the information processing program causes the computer to execute:

when the portable storage medium becomes readable by the information processing apparatus, reading the second data from the storage medium and installing the second data in the information processing apparatus; and starting and executing the application based on the first data remotely-stored in the portable storage medium and the locally-installed second data, and the first data stored in the portable storage medium is executed without being installed in the information processing apparatus.

15. A method of executing an application executed in an information processing apparatus capable of executing a program of the application stored in a portable storage medium, the storage medium having stored therein first data which is a program or data forming at least a part of the application and second data which is a program or data forming a part of the same application formed by the first data, the method comprising:

when the storage medium becomes readable by the information processing apparatus, reading the second data from the storage medium and installing the second data in the information processing apparatus; and starting and executing the application based on the first data remotely-stored in the portable storage medium and the locally-installed second data, wherein the first data stored in the portable storage medium is executed without being installed in the information processing apparatus.

16. A portable storage medium having stored therein a program of an application executed by a processor of an information processing apparatus, storing:

first data which is a program or data forming at least a part of the application; and second data which is: a program or data forming a part of the same application formed by the first data, wherein the program of the application causes the processor of the information processing apparatus to execute installing the second data in the information processing apparatus, and using the first data remotely-stored in the portable storage medium in order for the information processing apparatus to start and/or execute the application, and the first data stored in the portable storage medium is executed without being installed in the information processing apparatus.

* * * * *